United States Patent
Li et al.

(10) Patent No.: US 10,728,983 B2
(45) Date of Patent: *Jul. 28, 2020

(54) SYSTEMS AND METHODS FOR CURRENT REGULATION IN LIGHT-EMITTING-DIODE LIGHTING SYSTEMS

(71) Applicant: ON-BRIGHT ELECTRONICS (SHANGHAI) CO., LTD., Shanghai (CN)

(72) Inventors: Meng Li, Shanghai (CN); Mingli Kang, Shanghai (CN); Liqiang Zhu, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,901

(22) Filed: Mar. 20, 2019

(65) Prior Publication Data

US 2019/0357326 A1    Nov. 21, 2019

Related U.S. Application Data

(63) Continuation of application No. 15/836,493, filed on Dec. 8, 2017, now Pat. No. 10,285,228, which is a
(Continued)

(30) Foreign Application Priority Data

Sep. 14, 2015  (CN) .......................... 2015 1 0581725

(51) Int. Cl.
| | | |
|---|---|---|
| *G06F 1/00* | (2006.01) | |
| *H05B 37/02* | (2006.01) | |

(Continued)

(52) U.S. Cl.
CPC ............ *H05B 45/37* (2020.01); *H02M 1/088* (2013.01); *H02M 3/156* (2013.01); *H05B 45/00* (2020.01); *H05K 999/99* (2013.01); *Y02B 20/347* (2013.01)

(58) Field of Classification Search
None
See application file for complete search history.

(56) References Cited

U.S. PATENT DOCUMENTS

| | | | |
|---|---|---|---|
| 5,615,093 | A | 3/1997 | Nalbant |
| 7,230,406 | B2 | 6/2007 | Huang et al. |

(Continued)

FOREIGN PATENT DOCUMENTS

| | | |
|---|---|---|
| CN | 101014221 A | 8/2007 |
| CN | 101453818 A | 6/2009 |

(Continued)

OTHER PUBLICATIONS

China Patent Office, Office Action dated Mar. 13, 2017, in Application No. 201510581725.9.

(Continued)

*Primary Examiner* — Anh Q Tran
(74) *Attorney, Agent, or Firm* — Faegre Drinker Biddle & Reath LLP

(57) ABSTRACT

Systems and methods are provided herein for current regulation. An example system controller includes: a first controller terminal configured to receive an input voltage, the first controller terminal being further configured to allow a first current flowing into the system controller based at least in part on the input voltage in response to one or more switches being closed; a second controller terminal configured to allow the first current to flow out of the system controller through the second controller terminal in response to the one or more switches being closed; a fourth controller
(Continued)

terminal coupled to the third controller terminal through a first capacitor, the first capacitor not being any part of the system controller; and an error amplifier configured to generate a compensation signal based at least in part on the current sensing signal, the error amplifier including a second capacitor.

22 Claims, 15 Drawing Sheets

Related U.S. Application Data continuation of application No. 14/926,671, filed on Oct. 29, 2015, now Pat. No. 9,883,556.

(51) Int. Cl.
| | | |
|---|---|---|
| *H05B 39/04* | (2006.01) | |
| *H05B 41/36* | (2006.01) | |
| *H05B 45/37* | (2020.01) | |
| *H02M 3/156* | (2006.01) | |
| *H05B 45/00* | (2020.01) | |
| *H02M 1/088* | (2006.01) | |

(56) References Cited

U.S. PATENT DOCUMENTS

| | | | | |
|---|---|---|---|---|
| 9,049,763 | B1 | 6/2015 | Chiang et al. | |
| 9,872,347 | B2 | 1/2018 | Li et al. | |
| 9,883,556 | B2* | 1/2018 | Li | H05B 33/0815 |
| 10,244,592 | B2 | 3/2019 | Li et al. | |
| 10,244,593 | B2 | 3/2019 | Li et al. | |
| 10,285,228 | B2* | 5/2019 | Li | H05B 33/0815 |
| 2006/0043943 | A1 | 3/2006 | Huang et al. | |
| 2009/0015178 | A1* | 1/2009 | Liu | H05B 33/0815 |
| | | | | 315/297 |
| 2009/0019682 | A1 | 1/2009 | Liu | |
| 2009/0058322 | A1 | 3/2009 | Toma et al. | |
| 2010/0015178 | A1 | 1/2010 | Lu et al. | |
| 2010/0019682 | A1* | 1/2010 | Lu | H05B 33/0815 |
| | | | | 315/224 |
| 2010/0148681 | A1 | 6/2010 | Kuo et al. | |
| 2011/0292704 | A1 | 12/2011 | Makino et al. | |
| 2013/0088172 | A1 | 4/2013 | Kikuchi et al. | |
| 2013/0278165 | A1 | 10/2013 | Kikuchi et al. | |
| 2014/0354186 | A1 | 12/2014 | Sun et al. | |
| 2015/0311804 | A1 | 10/2015 | Fang | |
| 2017/0079097 | A1 | 3/2017 | Li et al. | |
| 2017/0079104 | A1 | 3/2017 | Li et al. | |
| 2018/0098396 | A1 | 4/2018 | Li et al. | |
| 2018/0124886 | A1 | 5/2018 | Li et al. | |
| 2018/0132317 | A1 | 5/2018 | Li et al. | |
| 2019/0104584 | A1 | 4/2019 | Li et al. | |
| 2019/0230757 | A1 | 7/2019 | Li et al. | |

FOREIGN PATENT DOCUMENTS

| | | |
|---|---|---|
| CN | 102143629 U | 8/2011 |
| CN | 201928475 U | 8/2011 |
| CN | 102364857 A | 2/2012 |
| CN | 102484931 A | 5/2012 |
| CN | 103248108 A | 8/2013 |
| CN | 103503562 A | 1/2014 |
| CN | 204258753 U | 4/2015 |
| CN | 104602390 A | 5/2015 |
| CN | 204392623 U | 6/2015 |
| TW | 201829 | 3/1993 |
| TW | 459466 | 10/2001 |
| TW | 200904253 A | 1/2009 |
| TW | 201043078 A1 | 12/2010 |
| TW | 201216765 A1 | 4/2012 |
| TW | 201401932 A | 1/2014 |
| TW | 201404242 | 1/2014 |
| TW | 201438520 A | 10/2014 |

OTHER PUBLICATIONS

China Patent Office, Office Action dated Jan. 22, 2018, in Application No. 201510581725.9.
China Patent Office, Office Action dated Aug. 7, 2018, in Application No. 201710724898.0.
Taiwan Intellectual Property Office, Office Action dated Jul. 21, 2017, in Application No. 106105378.
Taiwan Intellectual Property Office, Office Action dated Jul. 19, 2017, in Application No. 106105381.
Taiwan Intellectual Property Office, Office Action dated Jul. 20, 2017, in Application No. 106105382.
Taiwan Intellectual Property Office, Office Action dated Oct. 14, 2016, in Application No. 104133566.
Taiwan Intellectual Property Office, Office Action dated Jun. 28, 2017, in Application No. 106105377.
United States Patent and Trademark Office, Office Action dated Apr. 27, 2018, in U.S. Appl. No. 15/835,267.
United States Patent and Trademark Office, Notice of Allowance dated Oct. 9, 2018, in U.S. Appl. No. 15/835,267.
United States Patent and Trademark Office, Notice of Allowance dated Mar. 28, 2018, in U.S. Appl. No. 15/835,251.
United States Patent and Trademark Office, Notice of Allowance dated Jul. 11, 2018, in U.S. Appl. No. 15/835,251.
United States Patent and Trademark Office, Office Action dated Feb. 27, 2018, in U.S. Appl. No. 15/836,493.
United States Patent and Trademark Office, Office Action dated Aug. 27, 2018, in U.S. Appl. No. 15/836,493.
United States Patent and Trademark Office, Notice of Allowance dated Jan. 3, 2019, in U.S. Appl. No. 15/836,493.
United States Patent and Trademark Office, Office Action dated Jan. 17, 2019, in U.S. Appl. No. 16/151,076.
United States Patent and Trademark Office, Office Action dated Jul. 12, 2019, in U.S. Appl. No. 16/151,076.
United States Patent and Trademark Office, Notice of Allowance dated Nov. 1, 2019, in U.S. Appl. No. 16/151,076.
United States Patent and Trademark Office, Office Action dated Jan. 15, 2020, in U.S. Appl. No. 16/222,859.

\* cited by examiner

SYSTEMS AND METHODS FOR CURRENT REGULATION IN LIGHT-EMITTING-DIODE LIGHTING SYSTEMS

1. CROSS-REFERENCES TO RELATED APPLICATIONS

This application is a continuation of U.S. patent application Ser. No. 15/836,493, filed Dec. 8, 2017, which is a continuation of U.S. patent application Ser. No. 14/926,671, filed Oct. 29, 2015, which claims priority to Chinese Patent Application No. 201510581725.9, filed Sep. 14, 2015, all of the above-referenced applications being incorporated by reference herein for all purposes.

2. BACKGROUND OF THE INVENTION

Certain embodiments of the present invention are directed to integrated circuits. More particularly, some embodiments of the invention provide systems and methods for current regulation. Merely by way of example, some embodiments of the invention have been applied to light-emitting-diode lighting systems. But it would be recognized that the invention has a much broader range of applicability.

Light emitting diodes (LEDs) are widely used for lighting applications. FIG. 1 is a simplified diagram showing a conventional LED lighting system. The LED lighting system 100 includes a controller 102, resistors 108, 116, 122, 124 and 128, capacitors 106, 110, 112 and 130, a full-wave rectifying component 104, diodes 114 and 118, an inductive component 126 (e.g., an inductor), and a Zener diode 120. The controller 102 includes terminals (e.g., pins) 138, 140, 142, 144, 146 and 148.

An alternate-current (AC) input voltage 150 is applied to the system 100. The rectifying component 104 outputs a bulk voltage 152 (e.g., a rectified voltage no smaller than 0 V) associated with the AC input voltage 150. The capacitor 112 (e.g., C3) is charged in response to the bulk voltage 152 through the resistor 108 (e.g., R1), and a voltage 154 is provided to the controller 102 at the terminal 148 (e.g., terminal VDD). If the voltage 154 is larger than a threshold voltage (e.g., an under-voltage lock-out threshold) in magnitude, the controller 102 begins to operate, and a voltage associated with the terminal 148 (e.g., terminal VDD) is clamped to a predetermined voltage. The terminal 138 (e.g., terminal DRAIN) is connected to a drain terminal of an internal power switch. The controller 102 outputs a drive signal (e.g., a pulse-width-modulation signal) with a certain frequency and a certain duty cycle to close (e.g., turn on) or open (e.g., turn off) the internal power switch so that the system 100 operates normally.

If the internal power switch is closed (e.g., being turned on), the controller 102 detects the current flowing through one or more LEDs 132 through the resistor 122 (e.g., R2). Specifically, a voltage 156 on the resistor 122 (e.g., R2) is passed through the terminal 144 (e.g., terminal CS) to the controller 102 for signal processing during different switching periods associated with the internal power switch. When the internal power switch is opened (e.g., being turned off) during each switching period is affected by peak magnitudes of the voltage 156 on the resistor 122 (e.g., R2).

The inductive component 126 is connected with the resistors 124 and 128 which generate a voltage 158. The controller 102 receives the voltage 158 through the terminal 142 (e.g., terminal FB) for detection of a demagnetization process of the inductive component 126 to determine when the internal power switch is closed (e.g., being turned on). The capacitor 110 (e.g., C2) is connected to the terminal 140 (e.g., terminal COMP) which is associated with an internal error amplifier. The capacitor 130 (e.g., C4) is configured to maintain an output voltage 158 to keep stable current output for the one or more LEDs 132. A power supply network including the resistor 116 (e.g., R5), the diode 118 (e.g., D2) and the Zener diode 120 (e.g., ZD1) provides power supply to the controller 102.

The LED lighting system 100 has some disadvantages. For example, the system 100 includes many components which may make it difficult to reduce bill of materials count (BOM) and achieve circuit minimization and may cause a long start up time due to large current consumption.

Hence it is highly desirable to improve the techniques of current regulation in LED lighting systems.

3. BRIEF SUMMARY OF THE INVENTION

Certain embodiments of the present invention are directed to integrated circuits. More particularly, some embodiments of the invention provide systems and methods for current regulation. Merely by way of example, some embodiments of the invention have been applied to light-emitting-diode lighting systems. But it would be recognized that the invention has a much broader range of applicability.

According to one embodiment, a system controller includes: a first controller terminal configured to receive an input voltage, the first controller terminal being further configured to allow a first current flowing into the system controller based at least in part on the input voltage in response to one or more switches being closed; a second controller terminal configured to allow the first current to flow out of the system controller through the second controller terminal in response to the one or more switches being closed, the second controller terminal being further configured to receive a current sensing signal based at least in part on the first current; and a third controller terminal configured to be biased at a first voltage. The system controller further includes: a fourth controller terminal coupled to the third controller terminal through a first capacitor, the first capacitor not being any part of the system controller; an error amplifier configured to generate a compensation signal based at least in part on the current sensing signal, the error amplifier including a second capacitor; and a driver configured to generate a drive signal based at least in part on the compensation signal and output the drive signal to affect the first current flowing from the first controller terminal to the second controller terminal. The error amplifier further includes a first input terminal, a second input terminal, and an output terminal. The first input terminal is coupled directly or indirectly with the second controller terminal. The second input terminal is configured to receive a second voltage. The output terminal is coupled to the second capacitor not through any controller terminal.

According to another embodiment, a system controller is provided for regulating a current flowing from a first controller terminal to a second controller terminal. The system controller includes: a low pass filter configured to receive a current sensing signal related to the current flowing from the first controller terminal to the second controller terminal, the low pass filter being further configured to generate a filtered signal based at least in part on the current sensing signal; an error amplifier configured to receive the filtered signal and a first reference signal and generate a compensation signal based at least in part on the filtered signal and the first reference signal, the error amplifier including a capacitor; and a driver configured to generate a drive signal based on at least information associated with the compensation signal and output the drive signal to one or more switches to affect the current flowing from the first controller terminal to the second controller terminal. The error amplifier further includes a first input terminal, a second input terminal, and an output terminal. The first input terminal is configured to receive the filtered signal. The second input terminal is configured to receive the reference signal. The output terminal is coupled directly to the capacitor.

According to yet another embodiment, an error amplifier includes: a transconductance amplifier including a first input terminal and a second input terminal and a first output terminal, the first input terminal being configured to receive a first voltage signal, the second input terminal being configured to receive a second voltage signal, the first output terminal being configured to generate a current signal based at least in part on the first voltage signal and the second voltage signal; a first switch including a first switch terminal and a second switch terminal and configured to be open or closed in response to a first control signal, the first switch terminal being coupled to the first output terminal; a capacitor including a first capacitor terminal and a second capacitor terminal, the first capacitor terminal being coupled to the second switch terminal; an operational amplifier including a third input terminal, a fourth input terminal, and a second output terminal, the third input terminal being coupled to the first capacitor terminal; and a second switch including a third switch terminal and a fourth switch terminal, the third switch terminal being coupled to the second output terminal, the fourth switch terminal being coupled to the first output terminal, the second switch being configured to be open or closed in response to a second control signal. If the first control signal is at a first logic level, the second control signal is at a second logic level. If the first control signal is the second logic level, the second control signal is at the first logic level. The first logic level and the second logic level are different.

In one embodiment, a system controller includes: a first controller terminal configured to allow a first current to flow out of the system controller through the first controller terminal to a resistor associated with a resistance, the first controller terminal being further configured to receive a voltage signal based at least in part on the first current and the resistance, the resistor not being any part of the system controller. The system controller is configured to process the received voltage signal, generate a clock signal associated with an operating frequency based at least in part on the voltage signal, and change the operating frequency based at least in part on the resistance.

In another embodiment, a system controller is provided for regulating a current flowing through one or more light emitting diodes. The system controller includes: a voltage-to-current converter configured to receive a first voltage associated with a first controller terminal and generate a first current based at least in part on the first voltage, the first controller terminal being configured to provide a second current to a resistor for generating the first voltage; an oscillator configured to receive the first current and generate a clock signal based at least in part on the first current, the clock signal being associated with an operating frequency of the system controller; and a driver configured to generate a drive signal associated with the operating frequency and output the drive signal to affect a third current flowing through one or more light emitting diodes. The oscillator is further configured to generate a ramp signal associated with an operating frequency based at least in part on the first current, the operating frequency corresponding to an operating period, the operating period including a ramp-up period and a ramp-down period. The oscillator is further configured to: ramp up the ramp signal from a first magnitude to a second magnitude during the ramp-up period and ramp down the ramp signal from the second magnitude to the first magnitude during the ramp-down period, the first magnitude and the second magnitude being different; and adjust a duration of the ramp-down period in response to a change of the voltage signal in magnitude.

In yet another embodiment, a system controller is provided for regulating a current flowing through one or more light emitting diodes. The system controller includes: an error amplifier configured to receive a first voltage related to a first current flowing out of a first controller terminal and generate a second voltage based at least in part on the first voltage; a clock-signal generator configured to receive the second voltage and generate a clock signal based at least in part on the second voltage, the clock signal being associated with an operating frequency of the system controller; and a driver configured to generate a drive signal associated with the operating frequency and output the drive signal to affect a second current flowing through one or more light emitting diodes. The system controller is further configured to: keep the operating frequency unchanged at a first frequency magnitude in response to the second voltage changing if the second voltage remains smaller than a first voltage magnitude; keep the operating frequency unchanged at a second frequency magnitude in response to the second voltage changing if the second voltage remains larger than a second voltage magnitude; and change the operating frequency in response to the second voltage changing if the second voltage remains larger than the first voltage magnitude and smaller than the second voltage magnitude. The second voltage magnitude is larger than the first voltage magnitude.

In yet another embodiment, a method is provided for regulating a current flowing through one or more light emitting diodes. The method includes: receiving a first voltage related to a first current flowing out of a first controller terminal; generating a second voltage based at least in part on the first voltage; receiving the second voltage; generating a clock signal based at least in part on the second voltage, the clock signal being associated with an operating frequency; generating a drive signal associated with the operating frequency; and outputting the drive signal to affect a second current flowing through one or more light emitting diodes. Generating a clock signal based at least in part on the second voltage includes: keeping the operating frequency unchanged at a first frequency magnitude in response to the second voltage changing if the second voltage remains smaller than a first voltage magnitude; keeping the operating frequency unchanged at a second frequency magnitude in response to the second voltage changing if the second voltage remains larger than a second voltage magnitude; and changing the operating frequency in response to the second voltage changing if the second voltage remains larger than the first voltage magnitude and smaller than the second voltage magnitude. The second voltage magnitude is larger than the first voltage magnitude.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide systems and methods for current regulation. Merely by way of example, some embodiments of the invention have been applied to light-emitting-diode lighting systems. But it would be recognized that the invention has a much broader range of applicability.

Referring back to FIG. 1, the AC input voltage 150 often has a frequency of about 50 Hz or 60 Hz. A large compensation capacitor (e.g., with a capacitance of several hundred nF or even µF) is usually connected to the terminal 140 (e.g., terminal COMP) to maintain the system stability, which may result in higher system costs and increase the volume of the system board.

Figure 2:
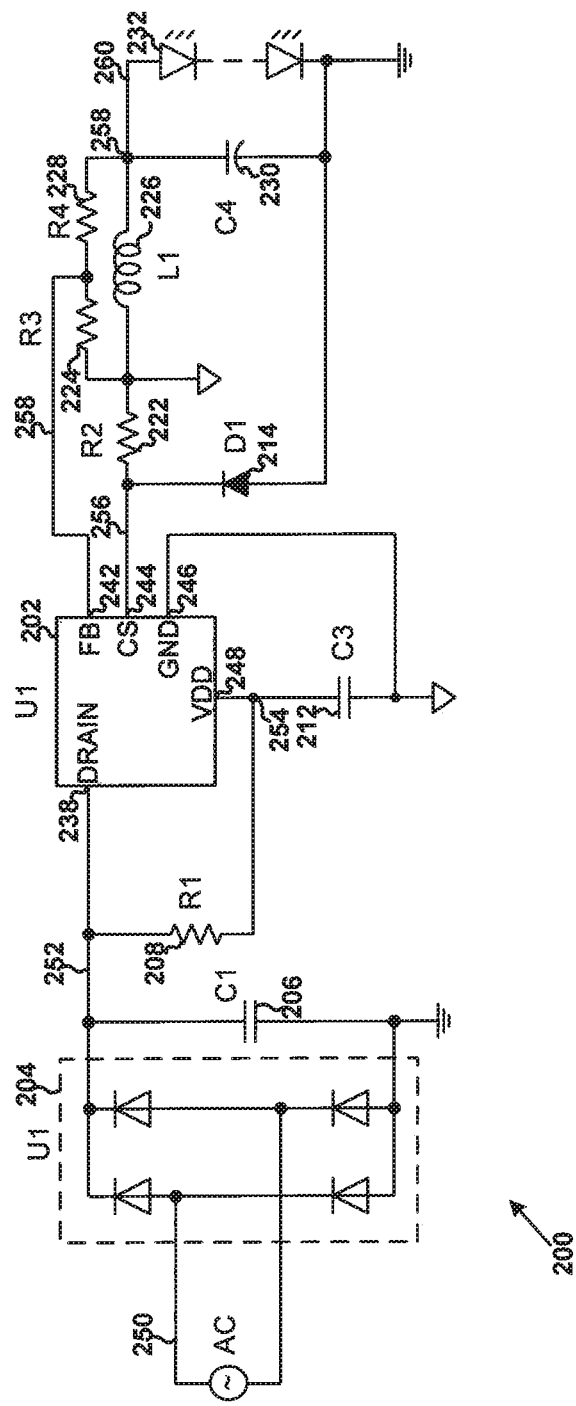
FIG. 2 is a simplified diagram showing an LED lighting system according to an embodiment of the present invention.

FIG. 2 is a simplified diagram showing an LED lighting system according to an embodiment of the present invention. This diagram is merely an example, which should not unduly limit the scope of the claims. One of ordinary skill in the art would recognize many variations, alternatives, and modifications. The LED lighting system 200 includes a controller 202, resistors 208, 222, 224 and 228, capacitors 206, 212 and 230, a full-wave rectifying component 204, a diode 214, and an inductive component 226 (e.g., an inductor). For example, the controller 202 includes terminals 238, 242, 244, 246 and 248. In some embodiments, the controller 202 is located on a chip, and the terminals 238, 242, 244, 246 and 248 correspond to different pins of the chip. As an example, the terminal 246 is biased to a chip ground voltage.

According to one embodiment, an alternate-current (AC) input voltage 250 is applied to the system 200. For example, the rectifying component 204 outputs a bulk voltage 252 (e.g., a rectified voltage no smaller than 0 V) associated with the AC input voltage 250. In another example, the capacitor 212 (e.g., C3) is charged in response to the bulk voltage 252 through the resistor 208 (e.g., R1), and a voltage 254 is provided to the controller 202 at the terminal 248 (e.g., terminal VDD). In yet another example, if the voltage 254 is larger than a threshold voltage (e.g., an under-voltage lock-out threshold) in magnitude, the controller 202 begins to operate, and a voltage associated with the terminal 248 (e.g., terminal VDD) is clamped to a predetermined voltage. In yet another example, the terminal 238 (e.g., terminal DRAIN) is connected to a drain terminal of an internal power switch. In yet another example, the controller 202 outputs a drive signal (e.g., a pulse-width-modulation signal) with a certain frequency and a certain duty cycle to close (e.g., turn on) or open (e.g., turn off) the internal power switch so that the system 200 operates normally.

According to another embodiment, if the internal power switch is closed (e.g., being turned on), the controller 202 detects the current flowing through one or more LEDs 232 through the resistor 222 (e.g., R2). For example, a sensing signal 256 generated on the resistor 222 (e.g., R2) is provided through the terminal 244 (e.g., terminal CS) to the controller 202 for signal processing during different switching periods associated with the internal power switch. In another example, when the internal power switch is opened (e.g., being turned off) during each switching period is affected by peak magnitudes of the signal 256 on the resistor 222 (e.g., R2). In yet another example, the inductive component 226 is connected with the resistors 224 and 228 which generate a feedback signal 258. In yet another example, the controller 202 receives the feedback signal 258 through the terminal 242 (e.g., terminal FB) for detection of a demagnetization process of the inductive component 226 to determine when the internal power switch is closed (e.g., being turned on).

Figure 1:
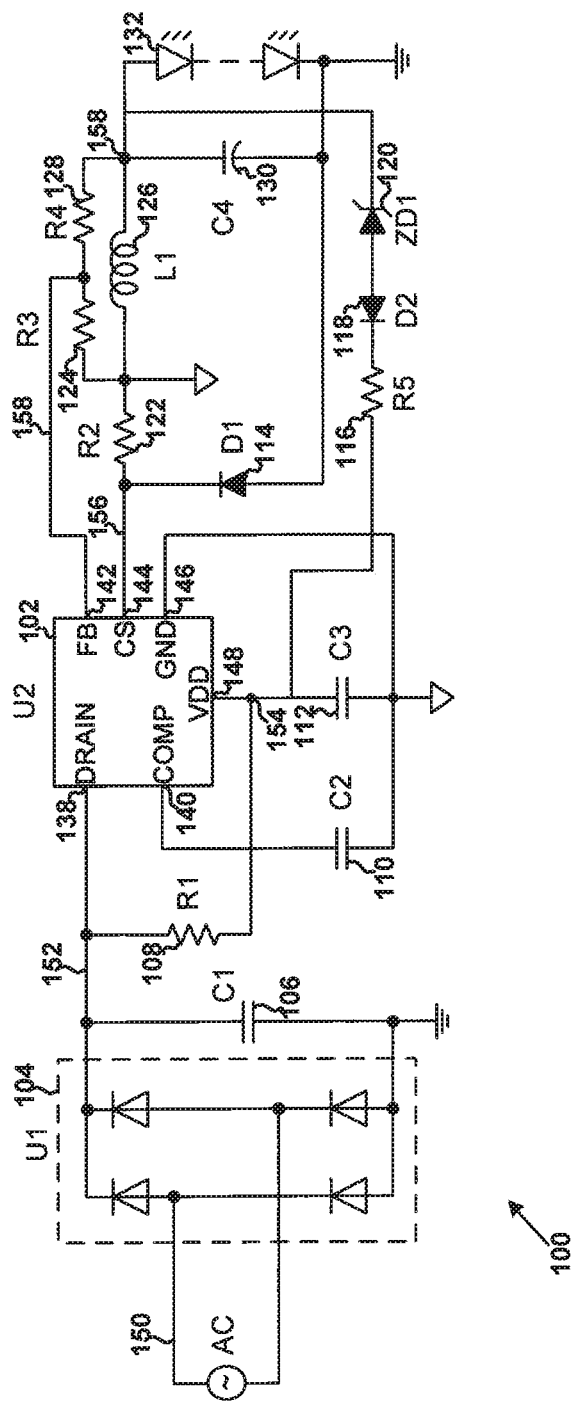
FIG. 1 is a simplified diagram showing a conventional LED lighting system.

According to yet another embodiment, the controller 202 includes an internal capacitor for compensation to achieve high power factor and high-precision constant LED current regulation. For example, the internal capacitor is connected to an internal error amplifier for compensation. As an example, the LED lighting system 200 can be implemented to operate in a quasi-resonant (QR) mode or in a discontinuous-conduction mode (DCM). In another example, the controller 202 does not include a terminal COMP (e.g., a pin) and does not include an external compensation capacitor connected to such a terminal either, compared with the controller 102. In yet another example, the system 200 does not include a power supply network (e.g., the network including the resistor 116 (e.g., R5), the diode 118 (e.g., D2) and the Zener diode 120 (e.g., ZD1) as shown in FIG. 1).

Figure 3:
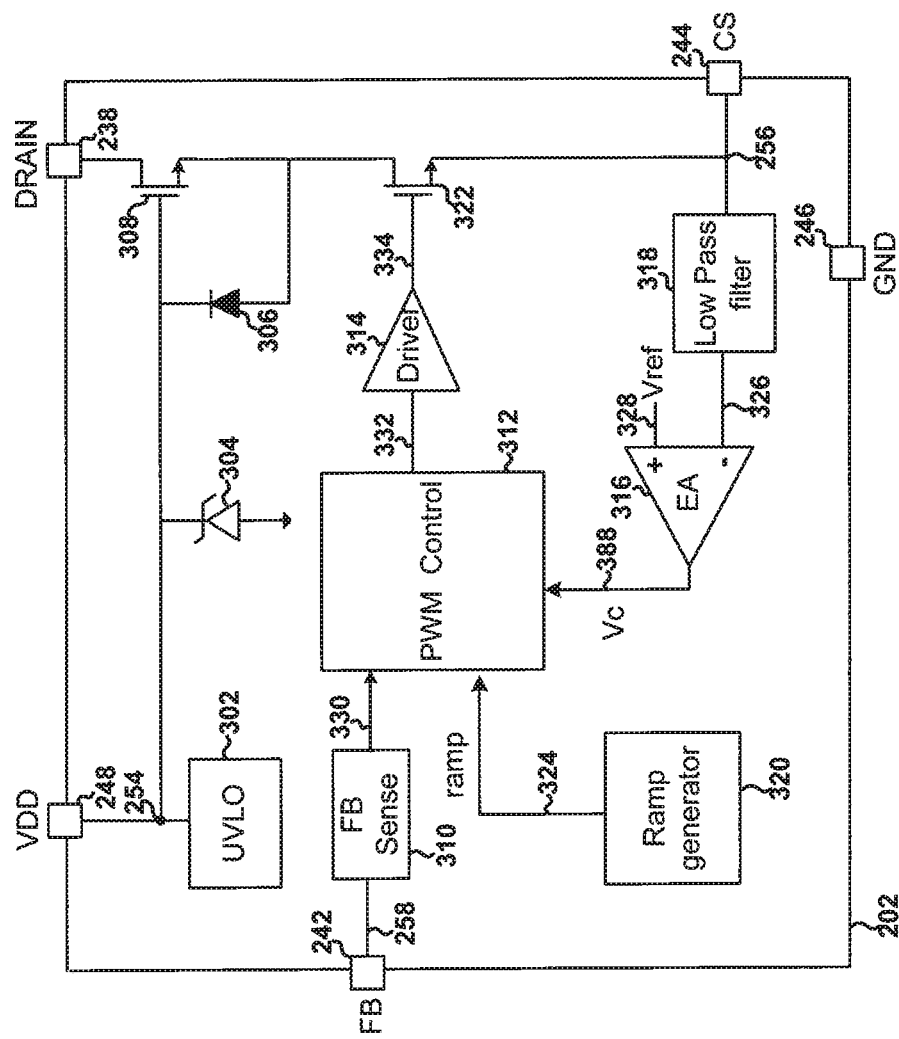
FIG. 3 is a simplified diagram showing a controller as part of the LED lighting system as shown in FIG. 2 according to an embodiment of the present invention.

FIG. 3 is a simplified diagram showing the controller 202 as part of the LED lighting system 200 according to an embodiment of the present invention. This diagram is merely an example, which should not unduly limit the scope of the claims. One of ordinary skill in the art would recognize many variations, alternatives, and modifications. The controller 202 includes a modulation component 312, an under-voltage lock-out (UVLO) component 302, a driver 314, a sensing component 310, a ramping-signal generator 320, a low pass filter 318, an error amplifier 316, a diode 306, a clamping component (e.g., a Zener diode) 304, and power switches 308 and 322. For example, the power switches 308 and 322 each include a transistor. In another example, the power switch 308 includes a metal-oxide-semiconductor field-effect transistor (MOSFET). In yet another example, the power switch 322 includes a MOSFET.

According to one embodiment, the terminal 248 (e.g., terminal VDD) is connected to a gate terminal of the switch 308 and the UVLO component 302 detects the voltage 254. For example, if the voltage 254 is larger than a predetermined threshold (e.g., a UVLO threshold) in magnitude, the controller 202 begins to operate. In another example, the sensing component 310 detects, through the terminal 242 (e.g., terminal FB), the feedback signal 258 to determine whether the demagnetization process associated with the inductive component 226 has completed and outputs a signal 330. In yet another example, the sensing component 310 determines whether the output voltage 258 exceeds a threshold so as to trigger an over-voltage mechanism.

According to another embodiment, the error amplifier 316 detects, through the terminal 244 (e.g., terminal CS), an output current 260 flowing through the one or more LEDs 232. For example, the low pass filter 318 receives the sensing signal 256 and outputs a signal 326 to the error amplifier 316 which also receives a reference signal 328. In another example, the error amplifier 316 outputs a signal 388 (e.g., $V_c$) to the modulation component 312 which also receives the signal 330 from the sensing component 310 and a ramp signal 324 from the ramping-signal generator 320. In yet another example, the modulation component 312 outputs a modulation signal 332 to the driver 314 which outputs a drive signal 334 to the switch 322 (e.g., at the gate terminal). In some embodiments, current consumption of the system 200 is reduced to a low magnitude with the operation of the controller 202, which may result in a fast start-up process. In certain embodiments, the error amplifier 316 is not connected directly to any controller terminal (e.g., any pin on a chip).

Figure 4:
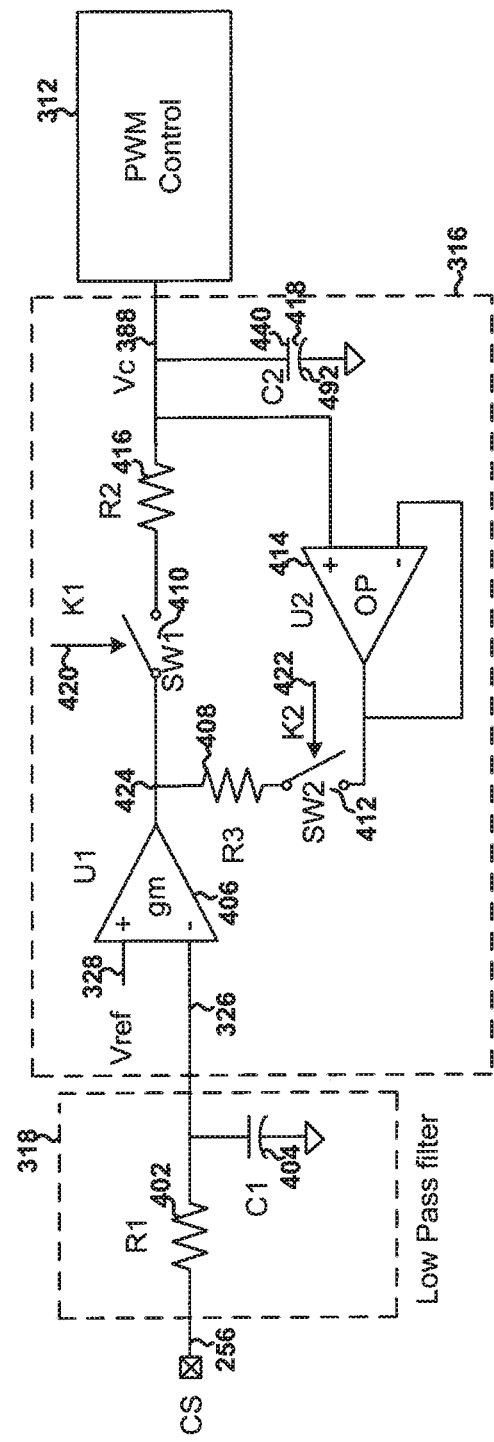
FIG. 4 is a simplified diagram showing certain components of the controller as part of the LED lighting system as shown in FIG. 2 according to an embodiment of the present invention.

FIG. 4 is a simplified diagram showing certain components of the controller 202 as part of the LED lighting system 200 according to an embodiment of the present invention. This diagram is merely an example, which should not unduly limit the scope of the claims. One of ordinary skill in the art would recognize many variations, alternatives, and modifications. The low pass filter 318 includes a RC filter containing a resistor 402 and a capacitor 404. For example, the error amplifier 316 includes a transconductance amplifier 406, resistors 408 and 416, switches 410 and 412, an operational amplifier 414, and a capacitor 418. In another example, the error amplifier 316 does not include the resistor 416.

According to one embodiment, the low pass filter 318 is configured to filter out the high frequency components of the signal 324 and outputs the signal 326 to the transconductance amplifier 406 (e.g., at the inverting input terminal, "−"). For example, the switch 410 (e.g., SW1) is connected between an output terminal of the transconductance amplifier 406 and the resistor 416 (e.g., R2). In another example, the resistor 416 is connected to the capacitor 418 (e.g., C2) which is connected to the operational amplifier 414 (e.g., at the non-inverting input terminal, "+"). In yet another example, the switch 412 (e.g., SW2) is connected between an output terminal of the operational amplifier 414 and the resistor 408 which is connected to the output terminal of the transconductance amplifier 406. In yet another example, the output terminal of the operational amplifier 414 is connected to its inverting input terminal, "−". In some embodiments, the capacitor 418 includes terminals 490 and 492. For example, the terminal 490 is not connected directly to any controller terminal (e.g., any pin on a chip).

According to another embodiment, the switch 410 (e.g., SW1) and the switch 412 (e.g., SW2) operate in response to a switching signal 420 (e.g., K1) and a switching signal 422 (e.g., K2), respectively. For example, the switching signal 420 (e.g., K1) and the switching signal 422 (e.g., K2) are complementary logic signals. In another example, the switching signal 420 (e.g., K1) and the switching signal 422 (e.g., K2) are clock signals generated by the controller 202, both corresponding to a same frequency.

Figure 5:
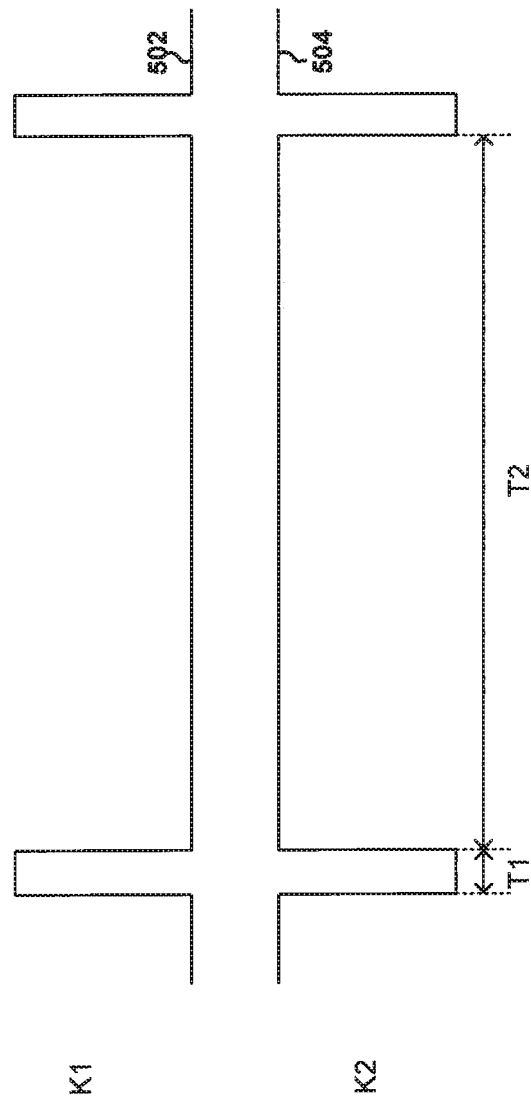
FIG. 5 is a simplified timing diagram for switching signals of the controller as part of the LED lighting system as shown in FIG. 4 according to another embodiment of the present invention.

FIG. 5 is a simplified timing diagram for the switching signals 420 and 422 of the controller 202 as part of the LED lighting system 200 according to another embodiment of the present invention. This diagram is merely an example, which should not unduly limit the scope of the claims. One of ordinary skill in the art would recognize many variations, alternatives, and modifications. The waveform 502 represents the switching signal 420 (e.g., K1) as a function of time, and the waveform 504 represents the switching signal 422 (e.g., K2) as a function of time.

According to one embodiment, during a first time period (e.g., $T_1$), the switching signal 420 (e.g., K1) is at a logic high level, and the switching signal 422 (e.g., K2) is at a logic low level. For example, during a second time period (e.g., $T_2$), the switching signal 422 is at a logic high level, and the switching signal 420 is at a logic low level.

Referring to FIG. 4 and FIG. 5, if the switching signal 420 (e.g., K1) is at the logic high level during a particular time period (e.g., $T_1$), then the switch 410 (e.g., SW1) is closed (e.g., being turned on), according to some embodiments. For example, the transconductance amplifier 406 outputs the signal 424 for charging/discharging the capacitor 418 (e.g., C2). As an example, the signal 388 is provided to the modulation component 312 to affect an on-time period during which the switch 322 is closed (e.g., being turned on).

According to certain embodiments, if the switching signal 420 (e.g., K1) is at the logic low level during another time period (e.g., $T_2$), then the switch 410 (e.g., SW1) is opened (e.g., being turned off). For example, the transconductance amplifier 406 is not connected to the capacitor 418 (e.g., C2), and the signal 388 associated with the capacitor 418 (e.g., C2) keeps at a magnitude before the switch 410 (e.g., SW1) is opened. In some embodiments, if the system 200 operates for a long period of time, the effective transconductance of the error amplifier 316 is determined as follows:

$$\overline{GM} = D \times g_m \qquad \text{(Equation 1)}$$

where D represents a duty cycle associated with the switch 410 (e.g., SW1), and $g_m$ represents the transconductance of the transconductance amplifier 406. For example, if the duty cycle associated with the switch 410 is far less than 1, the effective transconductance of the error amplifier 316 is reduced (e.g., proportionally), and correspondingly the capacitor 418 may have a smaller capacitance.

According to one embodiment, if the switching signal 420 (e.g., K1) is at the logic low level during another time period (e.g., $T_2$), the switching signal 422 (e.g., K2) is at the logic high level and the switch 412 (e.g., SW2) is closed (e.g., being turned on). For example, the signal 424 is clamped to be equal in magnitude to the signal 388 (e.g., the voltage on the capacitor 418, C2), considering the characteristics of the operational amplifier 414 which may serve as a buffer, so as to maintain the output of the transconductance amplifier 406 in a normal operation range. As an example, transient effects from the changes of the switching signal 420 (e.g., K1) are suppressed through proper measures.

As discussed above and further emphasized here, FIGS. 2, 3, 4 and 5 are merely examples, which should not unduly limit the scope of the claims. One of ordinary skill in the art would recognize many variations, alternatives, and modifications. For example, the controller 202 as shown in FIG. 3 and FIG. 4 can be implemented as part of the LED lighting system 200 which operates in a quasi-resonant (QR) mode or in a discontinuous-conduction mode (DCM).

Figure 6:
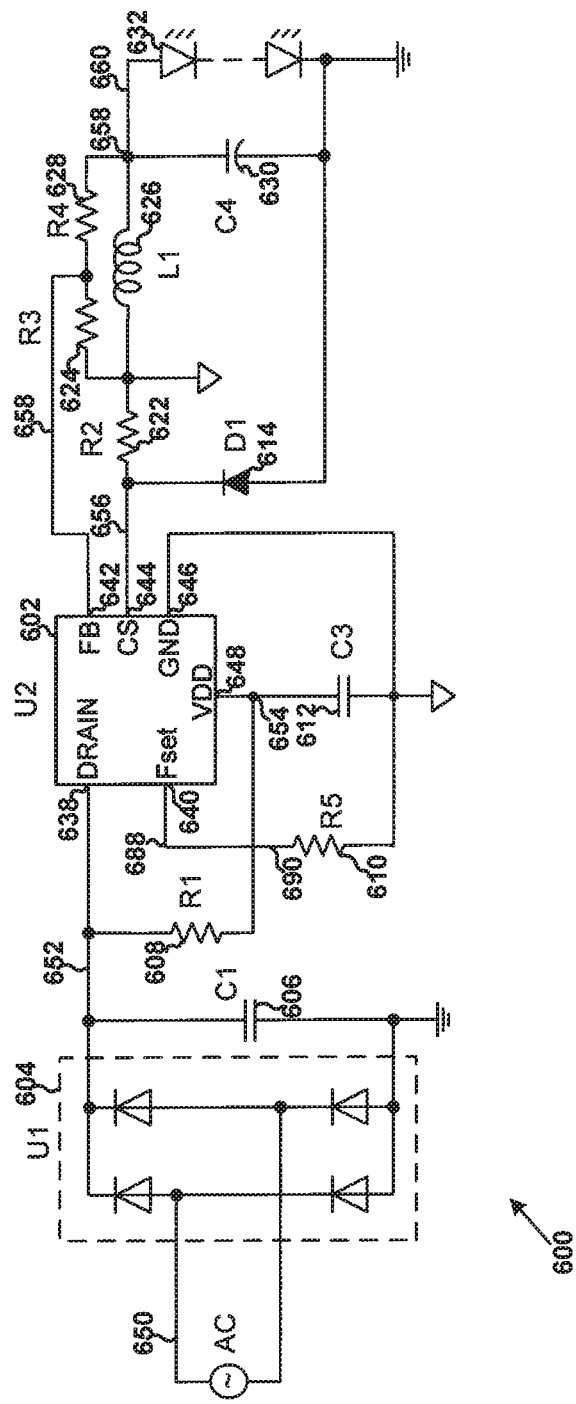
FIG. 6 is a simplified diagram showing an LED lighting system according to another embodiment of the present invention.

FIG. 6 is a simplified diagram showing an LED lighting system according to another embodiment of the present invention. This diagram is merely an example, which should not unduly limit the scope of the claims. One of ordinary skill in the art would recognize many variations, alternatives, and modifications. The LED lighting system 600 includes a controller 602, resistors 608, 610, 622, 624 and 628, capacitors 606, 612 and 630, a full-wave rectifying component 604, a diode 614, and an inductive component 626 (e.g., an inductor). For example, the controller 602 includes terminals (e.g., pins) 638, 640, 642, 644, 646 and 648. In some embodiments, the controller 602 is located on a chip, and the terminals 638, 642, 644, 646 and 648 correspond to different pins of the chip. As an example, the terminal 646 is biased to a chip ground voltage. As another example, the terminals 638, 642, 644, 646 and 648 are the same as the terminals 238, 242, 244, 246 and 248.

The system 600 adjusts an operating frequency through one or more external components (e.g., the resistor 610) connected to the terminal 640 (e.g., terminal Fset), according to some embodiments. For example, an alternate-current (AC) input voltage 650 is applied to the system 600. As an example, the rectifying component 604 outputs a bulk voltage 652 (e.g., a rectified voltage no smaller than 0 V) associated with the AC input voltage 650. In another example, the capacitor 612 (e.g., C3) is charged in response to the bulk voltage 652 through the resistor 608 (e.g., R1), and a voltage 654 is provided to the controller 602 at the terminal 648 (e.g., terminal VDD). In yet another example, if the voltage 654 is larger than a threshold voltage (e.g., an under-voltage lock-out threshold) in magnitude, the controller 602 begins to operate, and a voltage associated with the terminal 648 (e.g., terminal VDD) is clamped to a predetermined voltage. In yet another example, the terminal 638 (e.g., terminal DRAIN) is connected to a drain terminal of an internal power switch. In yet another example, the controller 602 outputs a drive signal (e.g., a pulse-width-modulation signal) with a certain frequency and a certain duty cycle to close (e.g., turn on) or open (e.g., turn off) the internal power switch so that the system 600 operates normally.

According to another embodiment, if the internal power switch is closed (e.g., being turned on), the controller 602 detects the current flowing through one or more LEDs 632 through the resistor 622 (e.g., R2). For example, a sensing signal 656 generated on the resistor 622 (e.g., R2) is provided through the terminal 644 (e.g., terminal CS) to the controller 602 for signal processing during different switching periods associated with the internal power switch. In another example, when the internal power switch is opened (e.g., being turned off) during each switching period is affected by peak magnitudes of the signal 656 on the resistor 622 (e.g., R2). In yet another example, the inductive component 626 is connected with the resistors 624 and 628 which generate a feedback signal 658. In yet another example, the controller 602 receives the feedback signal 658 through the terminal 642 (e.g., terminal FB) for detection of a demagnetization process of the inductive component 626 to determine when the internal power switch is closed (e.g., being turned on).

According to yet another embodiment, the controller 602 includes an internal capacitor for compensation to achieve high power factor and high-precision constant LED current regulation. For example, the internal capacitor is connected to an internal error amplifier for compensation. As an example, the LED lighting system 600 can be implemented to operate in a quasi-resonant (QR) mode or in a discontinuous-conduction mode (DCM). In another example, the controller 602 does not include a terminal COMP (e.g., a pin) and does not include an external compensation capacitor connected to such a terminal either, compared with the controller 102. In yet another example, the system 600 does not include a power supply network (e.g., the network including the resistor 116 (e.g., R5), the diode 118 (e.g., D2) and the Zener diode 120 (e.g., ZD1) as shown in FIG. 1).

According to yet another embodiment, a current 690 flows through the terminal 640 (e.g., terminal Fset) and a voltage 688 is generated by the resistor 610 in response to the current 690. For example, the current 690 flows from the terminal 640 toward the resistor 610. In another example, the current 690 flows from the resistor 610 toward the terminal 640. In yet another example, the controller 602 generates an internal clock signal using the voltage 688, and the operating frequency of the system 600 is related to the internal clock signal. In some embodiments, the resistance of the resistor 610 is changed so that the voltage 688 is changed to affect the operating frequency of the system 600.

Figure 7:
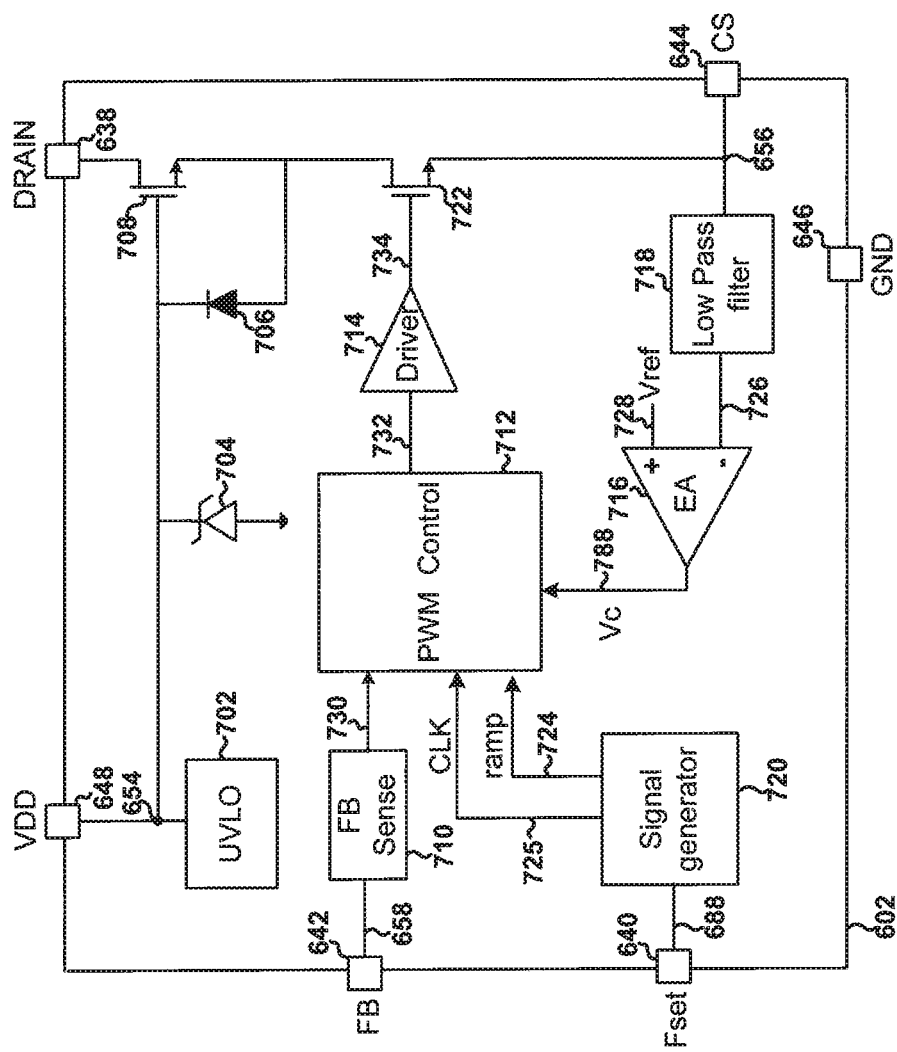
FIG. 7 is a simplified diagram showing a controller as part of the LED lighting system as shown in FIG. 6 according to an embodiment of the present invention.

FIG. 7 is a simplified diagram showing the controller 602 as part of the LED lighting system 600 according to an embodiment of the present invention. This diagram is merely an example, which should not unduly limit the scope of the claims. One of ordinary skill in the art would recognize many variations, alternatives, and modifications. The controller 602 includes a modulation component 712, an under-voltage lock-out (UVLO) component 702, a driver 714, a sensing component 710, a signal generator 720, a low pass filter 718, an error amplifier 716, a diode 706, a Zener diode 704, and power switches 708 and 722. For example, the power switches 708 and 722 each include a transistor. In another example, the power switch 708 includes a metal-oxide-semiconductor field-effect transistor (MOSFET). In yet another example, the power switch 722 includes a MOSFET.

In some embodiments, the error amplifier 716 is the same as the error amplifier 316. In certain embodiments, the low pass filter 718 is the same as the low pass filter 318. In particular embodiments, the driver 714 is the same as the driver 314.

According to one embodiment, the terminal 648 (e.g., terminal VDD) is connected to a gate terminal of the switch 708 and the UVLO component 702 detects the voltage 754.

For example, if the voltage 754 is larger than a predetermined threshold (e.g., a UVLO threshold) in magnitude, the controller 602 begins to operate. In another example, the sensing component 710 detects, through the terminal 642 (e.g., terminal FB), the feedback signal 658 to determine whether the demagnetization process associated with the inductive component 626 has completed and outputs a signal 730. In yet another example, the sensing component 710 determines whether the output voltage 658 exceeds a threshold so as to trigger an over-voltage mechanism.

According to another embodiment, the error amplifier 716 detects, through the terminal 644 (e.g., terminal CS), an output current 660 flowing through the one or more LEDs 632. For example, the low pass filter 718 receives the sensing signal 656 and outputs a signal 726 to the error amplifier 716 which also receives a reference signal 728. In another example, the error amplifier 716 outputs a signal 788 (e.g., $V_c$) to the modulation component 712 which also receives the signal 730 from the sensing component 710. In yet another example, the modulation component 712 receives a clock signal 725 and a ramp signal 724 from the signal generator 720 which receives the voltage 688 through the terminal 640 (e.g., terminal Fset). In yet another example, the modulation component 712 outputs a modulation signal 732 to the driver 714 which outputs a drive signal 734 to the switch 722 (e.g., at the gate terminal). As an example, the clock signal 725 and the ramp signal 724 are of a same frequency related to the operating frequency of the system 600 which corresponds to an operational period. As another example, the operational period includes a ramp-up period and a ramp-down period. As yet another example, the ramp signal ramps up from a first magnitude to a second magnitude during the ramp-up period and ramps down from the second magnitude to the first magnitude during the ramp-down period, the first magnitude and the second magnitude being different. In some embodiments, current consumption of the system 600 is reduced to a low magnitude with the operation of the controller 602, which may result in a fast start-up process.

Figure 8:
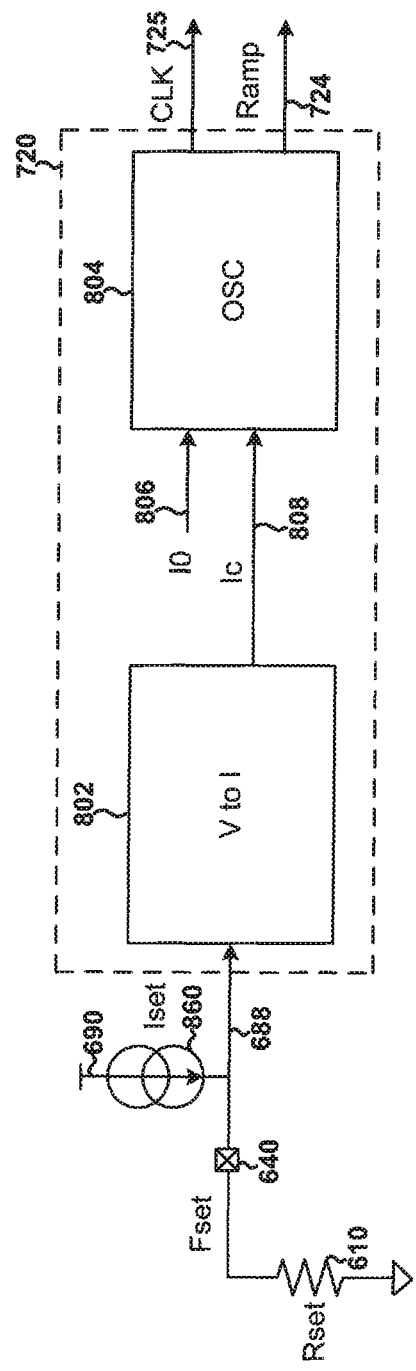
FIG. 8 is a simplified diagram showing certain components of the LED lighting system as shown in FIG. 6 according to an embodiment of the present invention.

FIG. 8 is a simplified diagram showing certain components of the LED lighting system 600 according to an embodiment of the present invention. This diagram is merely an example, which should not unduly limit the scope of the claims. One of ordinary skill in the art would recognize many variations, alternatives, and modifications. The signal generator 720 includes a voltage-to-current converter 802 and an oscillator 804.

According to one embodiment, the current 690 (e.g., generated by a current source component 860) flows through the terminal 640 (e.g., terminal Fset) to generate the voltage 688 and has a predetermined magnitude. For example, the current 690 flows from the terminal 640 toward the resistor 610. In another example, the current 690 flows from the resistor 610 toward the terminal 640. In yet another example, the converter 802 generates a current 808 (e.g., $I_c$) based on the voltage 688. In yet another example, the oscillator 804 receives the current 808 and a reference current 806 (e.g., $I_0$) and outputs the ramp signal 724 and the clock signal 725. As an example, the clock signal 725 and the ramp signal 724 are of a same frequency. In another example, the reference current 806 has a predetermined magnitude.

Figure 9:
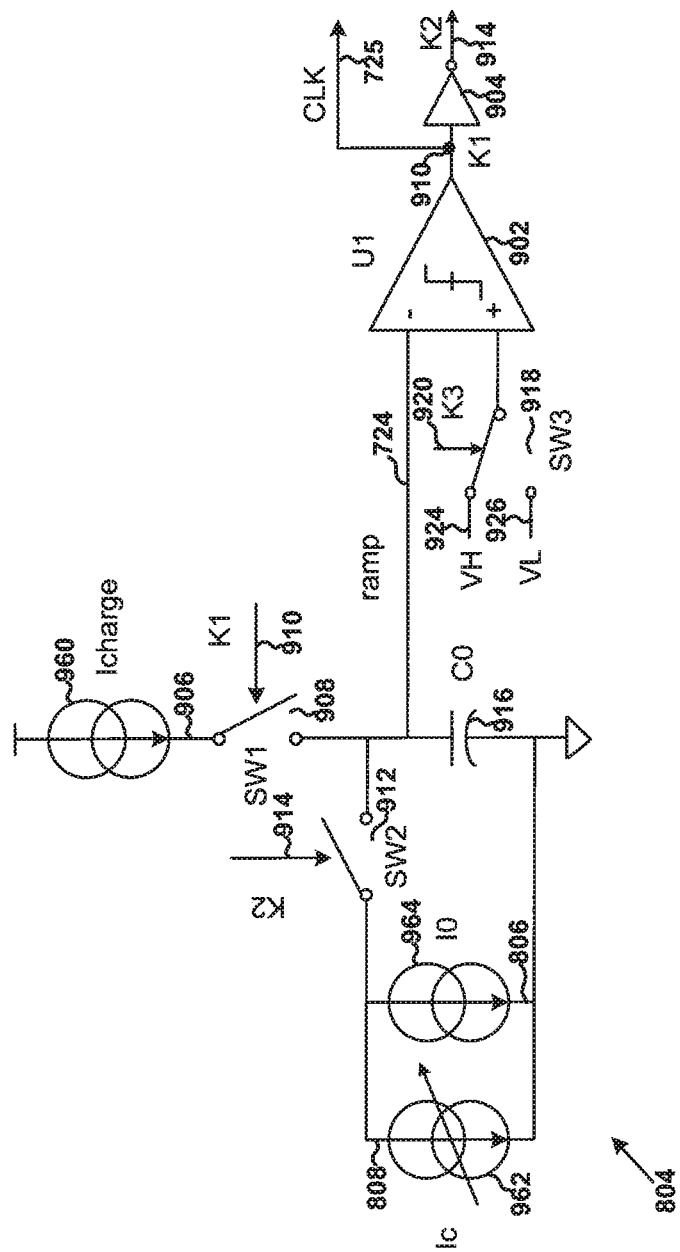
FIG. 9 is a simplified diagram showing an oscillator of a signal generator of the controller as part of the LED lighting system as shown in FIG. 8 according to an embodiment of the present invention.

FIG. 9 is a simplified diagram showing the oscillator 804 of the signal generator 720 of the controller 602 as part of the LED lighting system 600 according to an embodiment of the present invention. This diagram is merely an example, which should not unduly limit the scope of the claims. One of ordinary skill in the art would recognize many variations, alternatives, and modifications. The oscillator 804 includes a comparator 902, a NOT gate 904, switches 908, 912 and 918, and a capacitor 916.

Figure 10:
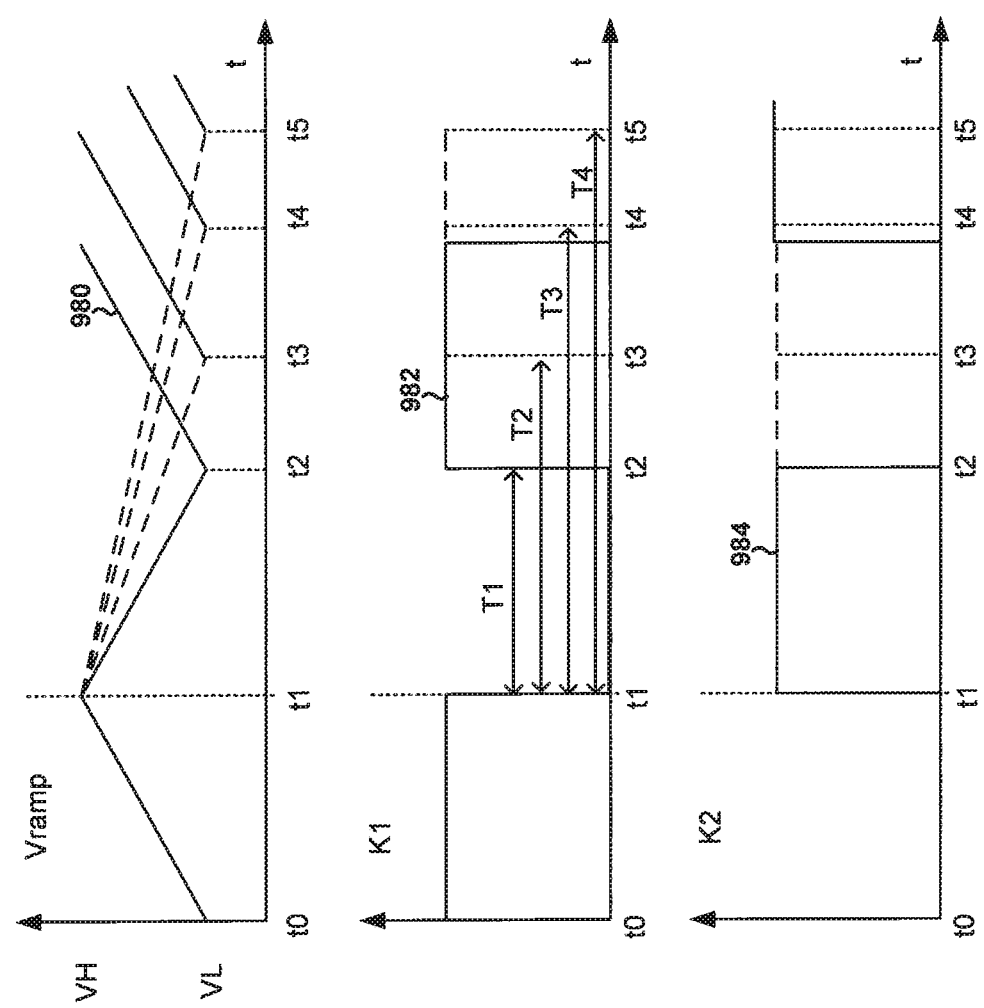
FIG. 10 is a simplified timing diagram for the oscillator of the signal generator of the controller as part of the LED lighting system as shown in FIG. 8 according to an embodiment of the present invention.

According to one embodiment, the switch 918 is connected to the comparator 902 (e.g., at the non-inverting input terminal, "+"), and the capacitor 916 is connected to the comparator 902 (e.g., at the inverting input terminal, "−"). For example, a charge current 906 (e.g., generated by a current sink component 960) flows through the switch 908 if the switch 908 is closed (e.g., being turned on) to charge the capacitor 916 to generate the ramp signal 724 which is received by the comparator 902 (e.g., at the inverting input terminal, "−"). In another example, the switches 908 and 912 are controlled by switching signals 910 and 914, respectively. In yet another example, the switching signals 910 and 914 are complementary to each other (e.g., as shown in FIG. 10). In yet another example, the switch 918 is controlled by a switching signal 920. As an example, if the switching signal 920 is at the logic high level, in response the switch 918 passes a voltage 924 (e.g., VH) to the comparator 902 (e.g., at the non-inverting terminal, "+"). As another example, if the switching signal 920 is at the logic low level, in response the switch 918 passes a voltage 926 (e.g., VL) to the comparator 902 (e.g., at the non-inverting terminal, "+"). As yet another example, the comparator 902 outputs the switching signal 910 which is the same as the clock signal 725. As yet another example, the NOT gate 904 outputs the switching signal 914.

FIG. 10 is a simplified timing diagram for the oscillator 804 of the signal generator 720 of the controller 602 as part of the LED lighting system 600 according to an embodiment of the present invention. This diagram is merely an example, which should not unduly limit the scope of the claims. One of ordinary skill in the art would recognize many variations, alternatives, and modifications. The waveform 980 represents the ramp signal 724 as a function of time, the waveform 982 represents the switching signal 910 (e.g., K1 as a function of time, and the waveform 984 represents the switching signal 914 (e.g., K2) as a function of time.

According to one embodiment, at time $t_0$, the oscillator 804 begins to operate, and the switch 918 passes the voltage 924 (e.g., VH) to the comparator 902. For example, between the time $t_0$ and time $t_1$, the switching signal 910 (e.g., K1) is at the logic high level (e.g., as shown by the waveform 982), and in response the switch 908 is closed (e.g., being turned on). In another example, the switching signal 914 (e.g., K2) is at the logic low level (e.g., as shown by the waveform 984), and in response the switch 912 is open (e.g., being turned off). In yet another example, the capacitor 916 is charged in response to the current 906 which flows through the switch 908. In yet another example, between the time $t_0$ and the time $t_1$, the ramp signal 724 increases (e.g., linearly) in magnitude over time (e.g., as shown by the waveform 980).

According to another embodiment, if the ramp signal 724 increases to become larger than the voltage 924 (e.g., VH) in magnitude (e.g., at the time $t_1$), the switching signal 910 (e.g., K1) changes to the logic low level (e.g., as shown by the waveform 982), and in response the switch 908 is opened (e.g., being turned off). For example, the switching signal 914 (e.g., K2) changes to the logic high level (e.g., at the time $t_1$ as shown by the waveform 984), and in response the switch 912 is closed (e.g., being turned on). In another example, the switch 918 passes the voltage 926 (e.g., VL) to the comparator 902. In yet another example, the capacitor 916 begins to be discharged based at least in part on the current 808 (e.g., $I_c$) and the current 806 (e.g., $I_0$). As an example, the current 808 (e.g., $I_c$) is generated by a current sink component 962, and the current 806 (e.g., $I_0$) is generated by a current sink component 964. As another example, between the time $t_1$ and time $t_2$, the switching signal 910 (e.g., K1) remains at the logic low level (e.g., as shown by the waveform 982), and the switching signal 914 (e.g., K2) remains at the logic high level (e.g., as shown by the waveform 984). In yet another example, the ramp signal 724 decreases (e.g., linearly) in magnitude.

According to yet another example, if the ramp signal 724 decreases to become smaller than the voltage 926 (e.g., VL) in magnitude (e.g., at the time $t_2$), the switching signal 910 (e.g., K1) changes to the logic high level (e.g., as shown by the waveform 982), and in response the switch 908 is closed (e.g., being turned on). For example, the switching signal 914 (e.g., K2) changes to the logic low level (e.g., as shown by the waveform 984), and in response the switch 912 is opened (e.g., being turned off). In another example, the switch 918 passes the voltage 926 (e.g., VH) to the comparator 902. In yet another example, the capacitor 916 begins to be charged in response to the current 906 that flows through the switch 908 again.

According to some embodiments, if the resistance of the resistor 610 is changed, the voltage 688 changes in magnitude, and in response the current 808 (e.g., $I_c$) changes in magnitude, which may change the duration of charging/discharging the capacitor 916 and thus the operating frequency of the system 600. For example, if the current 808 (e.g., $I_c$) decreases in magnitude, the duration of discharging the capacitor 916 increases (e.g., from T1 to T2 as shown in FIG. 10). The smaller the magnitude of the current 808 (e.g., $I_c$), the larger the duration of discharging the capacitor 916 (e.g., further increasing to T3 or T4 as shown in FIG. 10), according to certain embodiments. The larger the duration of discharging the capacitor 916, the smaller the operating frequency of the system 600, according to some embodiments.

As discussed above and further emphasized here, FIGS. 6-10 are merely examples, which should not unduly limit the scope of the claims. One of ordinary skill in the art would recognize many variations, alternatives, and modifications. For example, FIG. 6 is implemented together with FIG. 2. In another example, FIG. 3, FIG. 4, and/or FIG. 5 are implemented, individually or in combination, as at least one or more parts of the controller 602 as shown in FIG. 6.

Also, as discussed above and further emphasized here, FIGS. 2-5 are merely examples, which should not unduly limit the scope of the claims. One of ordinary skill in the art would recognize many variations, alternatives, and modifications. For example, an LED lighting system (e.g., operating in a DCM mode) can be configured to change an operating frequency with an output of an internal error amplifier, instead of having a fixed operating frequency.

Figure 11:
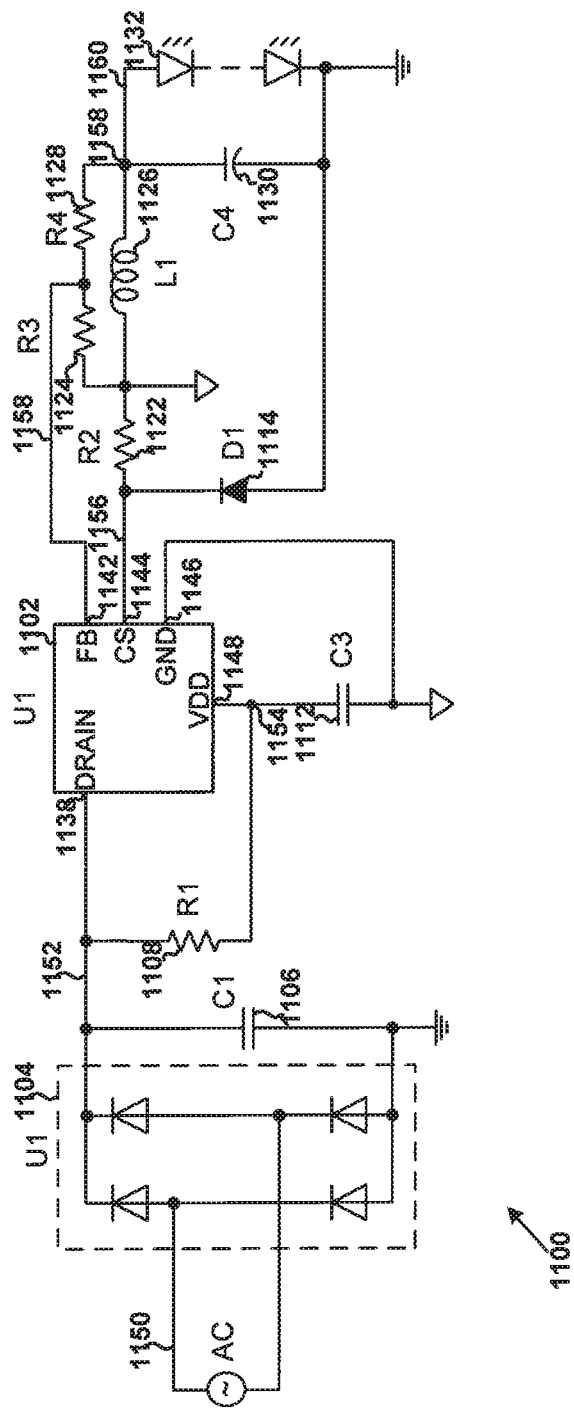
FIG. 11 is a simplified diagram showing an LED lighting system according to yet another embodiment of the present invention.

FIG. 11 is a simplified diagram showing an LED lighting system according to yet another embodiment of the present invention. This diagram is merely an example, which should not unduly limit the scope of the claims. One of ordinary skill in the art would recognize many variations, alternatives, and modifications. The LED lighting system 1100 includes a controller 1102, resistors 1108, 1122, 1124 and 1128, capacitors 1106, 1112 and 1130, a full-wave rectifying component 1104, a diode 1114, and an inductive component 1126 (e.g., an inductor). For example, the controller 1102 includes terminals 1138, 1142, 1144, 1146 and 1148. As an example, the controller 1102, the resistors 1108, 1122, 1124 and 1128, the capacitors 1106, 1112 and 1130, the full-wave rectifying component 1104, the diode 1114, and the inductive component 1126 are the same as the controller 202, the resistors 208, 222, 224 and 228, the capacitors 206, 212 and 230, the full-wave rectifying component 204, the diode 214, and the inductive component 226, respectively. In some embodiments, the controller 1102 is located on a chip, and the terminals 1138, 1142, 1144, 1146 and 1148 correspond to different pins of the chip. As an example, the terminal 1146 is biased to a chip ground voltage.

According to one embodiment, an alternate-current (AC) input voltage 1150 is applied to the system 1100. For example, the rectifying component 1104 outputs a bulk voltage 1152 (e.g., a rectified voltage no smaller than 0 V) associated with the AC input voltage 1150. In another example, the capacitor 1112 (e.g., C3) is charged in response to the bulk voltage 1152 through the resistor 1108 (e.g., R1), and a voltage 1154 is provided to the controller 1102 at the terminal 1148 (e.g., terminal VDD). In yet another example, if the voltage 1154 is larger than a threshold voltage (e.g., an under-voltage lock-out threshold) in magnitude, the controller 1102 begins to operate, and a voltage associated with the terminal 1148 (e.g., terminal VDD) is clamped to a predetermined voltage. In yet another example, the terminal 1138 (e.g., terminal DRAIN) is connected to a drain terminal of an internal power switch. In yet another example, the controller 1102 outputs a drive signal (e.g., a pulse-width-modulation signal) with a certain frequency and a certain duty cycle to close (e.g., turn on) or open (e.g., turn off) the internal power switch so that the system 1100 operates normally.

According to another embodiment, if the internal power switch is closed (e.g., being turned on), the controller 1102 detects the current flowing through one or more LEDs 1132 through the resistor 1122 (e.g., R2). For example, a sensing signal 1156 generated on the resistor 1122 (e.g., R2) is provided through the terminal 1144 (e.g., terminal CS) to the controller 1102 for signal processing during different switching periods associated with the internal power switch. In another example, when the internal power switch is opened (e.g., being turned off) during each switching period is affected by peak magnitudes of the signal 1156 on the resistor 1122 (e.g., R2). In yet another example, the inductive component 1126 is connected with the resistors 1124 and 1128 which generate a feedback signal 1158. In yet another example, the controller 1102 receives the feedback signal 1158 through the terminal 1142 (e.g., terminal FB) for detection of a demagnetization process of the inductive component 1126 to determine when the internal power switch is closed (e.g., being turned on).

According to yet another embodiment, the controller 1102 includes an internal capacitor for compensation to achieve high power factor and high-precision constant LED current regulation. For example, the internal capacitor is connected to an internal error amplifier for compensation. In another example, the operating frequency of the system 1100 changes with the output of the internal error amplifier. In yet another example, the smaller in magnitude the output of the internal error amplifier, the smaller in magnitude the operating frequency of the system 1100. As an example, the LED lighting system 1100 can be implemented to operate in a DCM or QR mode. In another example, the controller 1102 does not include a terminal COMP (e.g., a pin) and does not include an external compensation capacitor connected to such a terminal either, compared with the controller 102. In yet another example, the system 1100 does not include a power supply network (e.g., the network including the resistor 116 (e.g., R5), the diode 118 (e.g., D2) and the Zener diode 120 (e.g., ZD1) as shown in FIG. 1).

Figure 12:
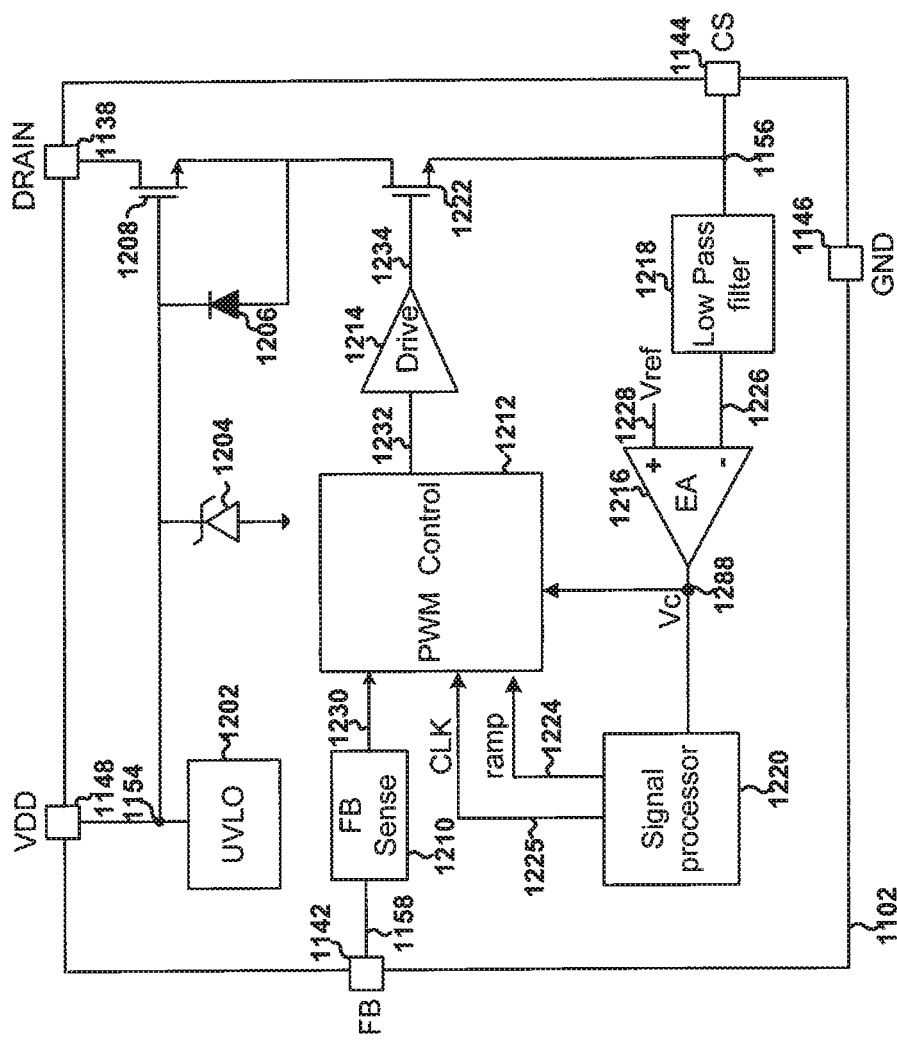
FIG. 12 is a simplified diagram showing the controller as part of the LED lighting system as shown in FIG. 11 according to an embodiment of the present invention.

FIG. 12 is a simplified diagram showing the controller 1102 as part of the LED lighting system 1100 according to an embodiment of the present invention. This diagram is merely an example, which should not unduly limit the scope of the claims. One of ordinary skill in the art would recognize many variations, alternatives, and modifications. The controller 1102 includes a modulation component 1212, an UVLO component 1202, a driver 1214, a sensing component 1210, a signal generator 1220, a low pass filter 1218, an error amplifier 1216, a diode 1206, a Zener diode 1204, and power switches 1208 and 1222. For example, the power switches 1208 and 1222 each include a transistor. In another example, the power switch 1208 includes a metal-oxide-semiconductor field-effect transistor (MOSFET). In yet another example, the power switch 1222 includes a MOSFET.

In some embodiments, the error amplifier 1216 is the same as the error amplifier 316. In certain embodiments, the low pass filter 1218 is the same as the low pass filter 318. In some embodiments, the driver 1214 is the same as the driver 314. In particular embodiments, the error amplifier 1216 is the same as the error amplifier 716. In certain embodiments, the low pass filter 1218 is the same as the low pass filter 718. In some embodiments, the modulation component 1212 is the same as the modulation component 712. In certain embodiments, the driver 1214 is the same as the driver 714.

According to one embodiment, the terminal 1148 (e.g., terminal VDD) is connected to a gate terminal of the switch 1208 and the UVLO component 1202 detects the voltage 1254. For example, if the voltage 1254 is larger than a predetermined threshold (e.g., a UVLO threshold) in magnitude, the controller 1102 begins to operate. In another example, the sensing component 1210 detects, through the terminal 1142 (e.g., terminal FB), the feedback signal 1158 to determine whether the demagnetization process associated with the inductive component 1126 has completed and outputs a signal 1230. In yet another example, the sensing component 1210 determines whether the output voltage 1158 exceeds a threshold so as to trigger an over-voltage mechanism.

According to another embodiment, the error amplifier 1216 detects, through the terminal 1144 (e.g., terminal CS), an output current 1160 flowing through the one or more LEDs 1132. For example, the low pass filter 1218 receives the sensing signal 1156 and outputs a signal 1226 to the error amplifier 1216 which also receives a reference signal 1228. In another example, the error amplifier 1216 outputs a signal 1288 (e.g., Vc) to the modulation component 1212 which also receives the signal 1230 from the sensing component 1210. In yet another example, the modulation component 1212 receives a clock signal 1225 and a ramp signal 1224 from the signal generator 1220 which receives the signal 1288 (e.g., $V_c$). In yet another example, the modulation component 1212 outputs a modulation signal 1232 to the driver 1214 which outputs a drive signal 1234 to the switch 1222 (e.g., at the gate terminal). As an example, the clock signal 1225 and the ramp signal 1224 are of a same frequency related to the operating frequency of the system 1100. In some embodiments, current consumption of the system 1100 is reduced to a low magnitude with the operation of the controller 1102, which may result in a fast start-up process.

Figure 13:
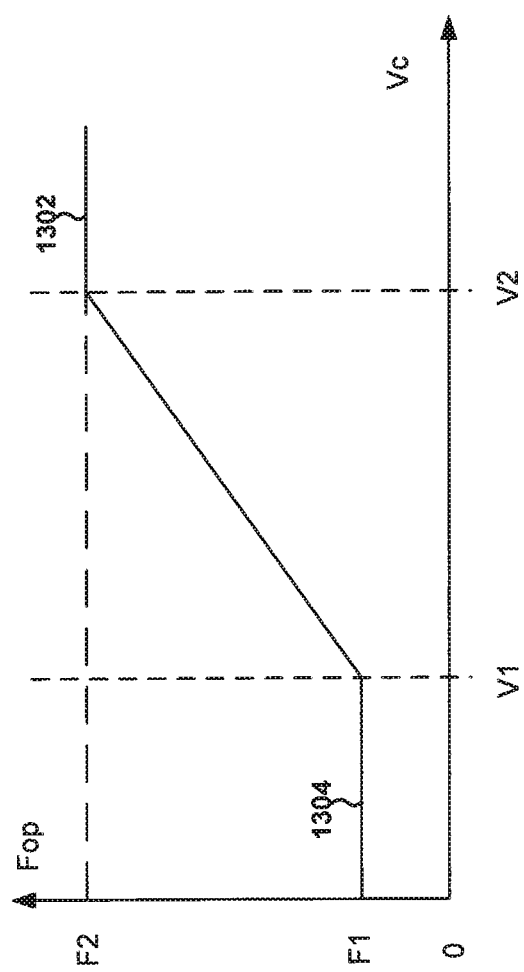
FIG. 13 is a simplified diagram showing a relationship between the operating frequency of the LED lighting system as shown in FIG. 11 and an internal signal of the controller as part of the LED lighting system according to an embodiment of the present invention.

FIG. 13 is a simplified diagram showing a relationship between the operating frequency of the system 1100 and the signal 1288 of the controller 1102 as part of the LED lighting system 1100 according to an embodiment of the present invention. This diagram is merely an example, which should not unduly limit the scope of the claims. One of ordinary skill in the art would recognize many variations, alternatives, and modifications.

According to one embodiment, if the signal 1288 (e.g., $V_c$) is smaller in magnitude than a first voltage (e.g., V1), the operating frequency of the system 1100 keeps at a magnitude 1304. For example, if the signal 1288 (e.g., $V_c$) is larger in magnitude than a second voltage (e.g., V2), the operating frequency of the system 1100 keeps at a magnitude 1302. In another example, if the signal 1288 (e.g., $V_c$) is smaller in magnitude than the second voltage (e.g., V2) and larger in magnitude than the first voltage (e.g., V1), the operating frequency of the system 1100 changes with the signal 1288 (e.g., $V_c$). As an example, if the signal 1288 (e.g., $V_c$) is smaller in magnitude than the second voltage (e.g., V2) and larger in magnitude than the first voltage (e.g., V1), the operating frequency of the system 1100 increases (e.g., linearly or non-linearly) with the increasing signal 1288 (e.g., $V_c$).

Figure 14:
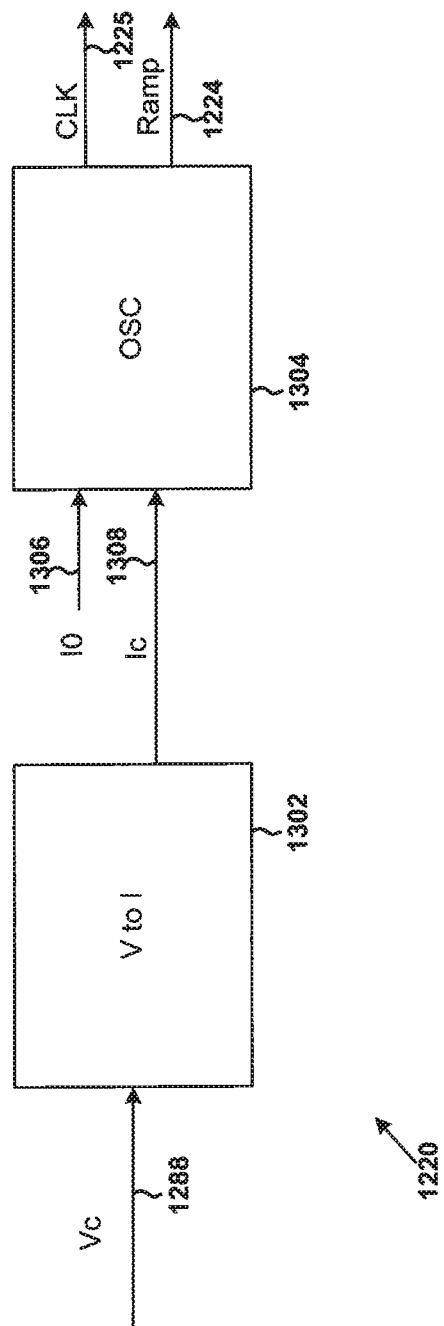
FIG. 14 is a simplified diagram showing a signal generator of the controller as part of the LED lighting system as shown in FIG. 12 according to an embodiment of the present invention.

FIG. 14 is a simplified diagram showing the signal generator 1220 of the controller 1102 as part of the LED lighting system 1100 according to an embodiment of the present invention. This diagram is merely an example, which should not unduly limit the scope of the claims. One of ordinary skill in the art would recognize many variations, alternatives, and modifications. The signal generator 1220 includes a voltage-to-current converter 1302 and an oscillator 1304.

According to one embodiment, the converter 1302 receives the signal 1288 (e.g., $V_c$) and generates a current 1308 (e.g., Ic). For example, the oscillator 1304 receives the current 1308 and a reference current 1306 (e.g., I0) and outputs the ramp signal 1224 and the clock signal 1225. As an example, the clock signal 1225 and the ramp signal 1224 are of a same frequency. In another example, the reference current 1306 has a predetermined magnitude.

Figure 15:
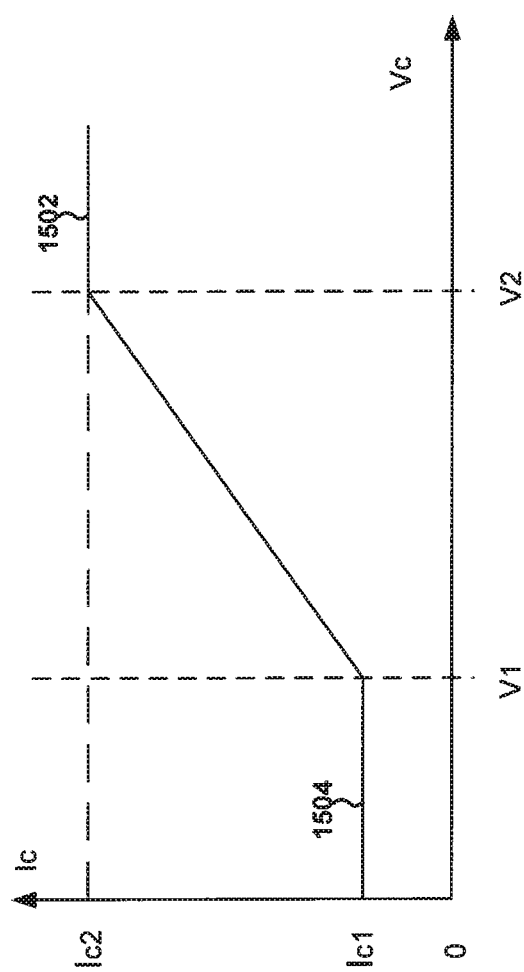
FIG. 15 is a simplified diagram showing a relationship between an internal current and an internal signal of the controller as shown in FIG. 12 as part of the LED lighting system according to an embodiment of the present invention.

FIG. 15 is a simplified diagram showing a relationship between the current 1308 (e.g., $I_c$) and the signal 1288 of the controller 1102 as part of the LED lighting system 1100 according to an embodiment of the present invention. This diagram is merely an example, which should not unduly limit the scope of the claims. One of ordinary skill in the art would recognize many variations, alternatives, and modifications.

According to one embodiment, if the signal 1288 (e.g., $V_c$) is smaller in magnitude than a first voltage (e.g., V1), the current 1308 (e.g., $I_c$) keeps at a magnitude 1504. For example, if the signal 1288 (e.g., $V_c$) is larger in magnitude than a second voltage (e.g., V2), the current 1308 (e.g., $I_c$) keeps at a magnitude 1502. In another example, if the signal 1288 (e.g., $V_c$) is smaller in magnitude than the second voltage (e.g., V2) and larger in magnitude than the first voltage (e.g., V1), the current 1308 (e.g., $I_c$) changes with the signal 1288 (e.g., $V_c$). As an example, if the signal 1288 (e.g., $V_c$) is smaller in magnitude than the second voltage (e.g., V2) and larger in magnitude than the first voltage (e.g., V1), the current 1308 (e.g., $I_c$) increases (e.g., linearly or non-linearly) with the increasing signal 1288 (e.g., $V_c$).

As discussed above and further emphasized here, FIGS. 11-15 are merely examples, which should not unduly limit the scope of the claims. One of ordinary skill in the art would recognize many variations, alternatives, and modifications. In one embodiment, FIG. 11 is implemented together with FIG. 2. For example, FIG. 3, FIG. 4, and/or FIG. 5 are implemented, individually or in combination, as at least one or more parts of the controller 1102 as shown in FIG. 11.

In another embodiment, FIG. 11 is implemented together with FIG. 6. For example, FIG. 7, FIG. 8, FIG. 9, and/or FIG. 10 are implemented, individually or in combination, as at least one or more parts of the controller 1102 as shown in FIG. 11. In yet another embodiment, FIG. 11 is implemented together with both FIG. 2 and FIG. 6. For example, FIG. 3, FIG. 4, FIG. 5, FIG. 6, FIG. 7, FIG. 8, FIG. 9, and/or FIG. 10 are implemented, individually or in combination, as at least one or more parts of the controller 1102 as shown in FIG. 11.

According to another embodiment, a system controller includes: a first controller terminal configured to receive an input voltage, the first controller terminal being further configured to allow a first current flowing into the system controller based at least in part on the input voltage in response to one or more switches being closed; a second controller terminal configured to allow the first current to flow out of the system controller through the second controller terminal in response to the one or more switches being closed, the second controller terminal being further configured to receive a current sensing signal based at least in part on the first current; and a third controller terminal configured to be biased at a first voltage. The system controller further includes: a fourth controller terminal coupled to the third controller terminal through a first capacitor, the first capacitor not being any part of the system controller; an error amplifier configured to generate a compensation signal based at least in part on the current sensing signal, the error amplifier including a second capacitor; and a driver configured to generate a drive signal based at least in part on the compensation signal and output the drive signal to affect the first current flowing from the first controller terminal to the second controller terminal. The error amplifier further includes a first input terminal, a second input terminal, and an output terminal. The first input terminal is coupled directly or indirectly with the second controller terminal. The second input terminal is configured to receive a second voltage. The output terminal is coupled to the second capacitor not through any controller terminal. For example, the system controller is implemented according to at least FIG. 2, FIG. 3, FIG. 4, FIG. 11, FIG. 12, and/or FIG. 14.

According to another embodiment, a system controller is provided for regulating a current flowing from a first controller terminal to a second controller terminal. The system controller includes: a low pass filter configured to receive a current sensing signal related to the current flowing from the first controller terminal to the second controller terminal, the low pass filter being further configured to generate a filtered signal based at least in part on the current sensing signal; an error amplifier configured to receive the filtered signal and a first reference signal and generate a compensation signal based at least in part on the filtered signal and the first reference signal, the error amplifier including a capacitor; and a driver configured to generate a drive signal based on at least information associated with the compensation signal and output the drive signal to one or more switches to affect the current flowing from the first controller terminal to the second controller terminal. The error amplifier further includes a first input terminal, a second input terminal, and an output terminal. The first input terminal is configured to receive the filtered signal. The second input terminal is configured to receive the reference signal. The output terminal is coupled directly to the capacitor. For example, the system controller is implemented according to at least FIG. 3 and/or FIG. 4.

According to yet another embodiment, an error amplifier includes: a transconductance amplifier including a first input terminal and a second input terminal and a first output terminal, the first input terminal being configured to receive a first voltage signal, the second input terminal being configured to receive a second voltage signal, the first output terminal being configured to generate a current signal based at least in part on the first voltage signal and the second voltage signal; a first switch including a first switch terminal and a second switch terminal and configured to be open or closed in response to a first control signal, the first switch terminal being coupled to the first output terminal; a capacitor including a first capacitor terminal and a second capacitor terminal, the first capacitor terminal being coupled to the second switch terminal; an operational amplifier including a third input terminal, a fourth input terminal, and a second output terminal, the third input terminal being coupled to the first capacitor terminal; and a second switch including a third switch terminal and a fourth switch terminal, the third switch terminal being coupled to the second output terminal, the fourth switch terminal being coupled to the first output terminal, the second switch being configured to be open or closed in response to a second control signal. If the first control signal is at a first logic level, the second control signal is at a second logic level. If the first control signal is the second logic level, the second control signal is at the first logic level. The first logic level and the second logic level are different. For example, the error amplifier is implemented according to at least FIG. 4.

In one embodiment, a system controller includes: a first controller terminal configured to allow a first current to flow out of the system controller through the first controller terminal to a resistor associated with a resistance, the first controller terminal being further configured to receive a voltage signal based at least in part on the first current and the resistance, the resistor not being any part of the system controller. The system controller is configured to process the received voltage signal, generate a clock signal associated with an operating frequency based at least in part on the voltage signal, and change the operating frequency based at least in part on the resistance. For example, the system controller is implemented according to at least FIG. 6, FIG. 7, FIG. 8, and/or FIG. 9.

In another embodiment, a system controller is provided for regulating a current flowing through one or more light emitting diodes. The system controller includes: a voltage-to-current converter configured to receive a first voltage associated with a first controller terminal and generate a first current based at least in part on the first voltage, the first controller terminal being configured to provide a second current to a resistor for generating the first voltage; an oscillator configured to receive the first current and generate a clock signal based at least in part on the first current, the clock signal being associated with an operating frequency of the system controller; and a driver configured to generate a drive signal associated with the operating frequency and output the drive signal to affect a third current flowing through one or more light emitting diodes. The oscillator is further configured to generate a ramp signal associated with an operating frequency based at least in part on the first current, the operating frequency corresponding to an operating period, the operating period including a ramp-up period and a ramp-down period. The oscillator is further configured to: ramp up the ramp signal from a first magnitude to a second magnitude during the ramp-up period and ramp down the ramp signal from the second magnitude to the first magnitude during the ramp-down period, the first magnitude and the second magnitude being different; and adjust a duration of the ramp-down period in response to a change of the voltage signal in magnitude. For example, the system controller is implemented according to at least FIG. 7 and/or FIG. 8.

In yet another embodiment, a system controller is provided for regulating a current flowing through one or more light emitting diodes. The system controller includes: an error amplifier configured to receive a first voltage related to a first current flowing out of a first controller terminal and generate a second voltage based at least in part on the first voltage; a clock-signal generator configured to receive the second voltage and generate a clock signal based at least in part on the second voltage, the clock signal being associated with an operating frequency of the system controller; and a driver configured to generate a drive signal associated with the operating frequency and output the drive signal to affect a second current flowing through one or more light emitting diodes. The system controller is further configured to: keep the operating frequency unchanged at a first frequency magnitude in response to the second voltage changing if the second voltage remains smaller than a first voltage magnitude; keep the operating frequency unchanged at a second frequency magnitude in response to the second voltage changing if the second voltage remains larger than a second voltage magnitude; and change the operating frequency in response to the second voltage changing if the second voltage remains larger than the first voltage magnitude and smaller than the second voltage magnitude. The second voltage magnitude is larger than the first voltage magnitude. For example, the system controller is implemented according to at least FIG. 12, and/or FIG. 13.

In yet another embodiment, a method is provided for regulating a current flowing through one or more light emitting diodes. The method includes: receiving a first voltage related to a first current flowing out of a first controller terminal; generating a second voltage based at least in part on the first voltage; receiving the second voltage; generating a clock signal based at least in part on the second voltage, the clock signal being associated with an operating frequency; generating a drive signal associated with the operating frequency; and outputting the drive signal to affect a second current flowing through one or more light emitting diodes. Generating a clock signal based at least in part on the second voltage includes: keeping the operating frequency unchanged at a first frequency magnitude in response to the second voltage changing if the second voltage remains smaller than a first voltage magnitude; keeping the operating frequency unchanged at a second frequency magnitude in response to the second voltage changing if the second voltage remains larger than a second voltage magnitude; and changing the operating frequency in response to the second voltage changing if the second voltage remains larger than the first voltage magnitude and smaller than the second voltage magnitude. The second voltage magnitude is larger than the first voltage magnitude. For example, the method is implemented according to at least FIG. 12, and/or FIG. 13.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller comprising:
a first controller terminal configured to receive an input voltage, the first controller terminal being further configured to allow a first current flowing into the system controller based at least in part on the input voltage in response to one or more switches being closed;
a second controller terminal configured to allow the first current to flow out of the system controller through the second controller terminal in response to the one or more switches being closed, the second controller terminal being further configured to receive a current sensing signal based at least in part on the first current;
a third controller terminal;
a fourth controller terminal coupled to the third controller terminal through a capacitor, the capacitor not being any part of the system controller;
an error amplifier configured to generate a compensation signal based at least in part on the current sensing signal; and
a driver configured to generate a drive signal based at least in part on the compensation signal and output the drive signal to affect the first current flowing from the first controller terminal to the second controller terminal;
wherein the fourth controller terminal is coupled to a clamping device.

2. The system controller of claim 1 is located on a chip.

3. The system controller of claim 2 wherein:
the first controller terminal is a first pin of the chip;
the second controller terminal is a second pin of the chip;
the third controller terminal is a third pin of the chip; and
the fourth controller terminal is a fourth pin of the chip.

4. The system controller of claim 3 wherein the error amplifier and the driver both are located on the chip.

5. The system controller of claim 3 wherein the capacitor is located off the chip.

6. The system controller of claim 3 wherein the one or more switches are located on the chip.

7. The system controller of claim 1 wherein the one or more switches are coupled between the first controller terminal and the second controller terminal and are configured to close or open in response to the drive signal.

8. The system controller of claim 1, further comprising a fifth controller terminal configured to receive a feedback signal and detect a demagnetization process based at least in part on the feedback signal.

9. The system controller of claim 8 wherein the system controller includes no controller terminal other than the first controller terminal, the second controller terminal, the third controller terminal, the fourth controller terminal, and the fifth controller terminal.

10. The system controller of claim 1 wherein the one or more switches are one or more parts of the system controller.

11. A system controller for regulating a current flowing from a first controller terminal to a second controller terminal, the system controller comprising:
- a filter configured to receive a current sensing signal related to the current flowing from the first controller terminal to the second controller terminal, the filter being further configured to generate a filtered signal based at least in part on the current sensing signal;
- an error amplifier configured to receive the filtered signal and a first reference signal and generate a compensation signal based at least in part on the filtered signal and the first reference signal, the error amplifier including a capacitor;
- a driver configured to generate a drive signal based on at least information associated with the compensation signal and output the drive signal to one or more switches to affect the current flowing from the first controller terminal to the second controller terminal; and
- a feedback sensor configured to receive a feedback signal and detect a demagnetization process based at least in part on the feedback signal;

wherein:
- the one or more switches are coupled to the first controller terminal and the second controller terminal; and
- the one or more switches are configured to allow the current to flow from the first controller terminal through the one or more switches to the second controller terminal in response to the one or more switches being closed.

12. The system controller of claim 11 is located on a chip.

13. The system controller of claim 12 wherein:
- each of the filter, the error amplifier, and the driver is located on the chip; and
- the capacitor is located on the chip.

14. The system controller of claim 12 wherein the one or more switches are located on the chip.

15. An error amplifier comprising:
- a transconductance amplifier including a first input terminal and a second input terminal and a first output terminal;
- a first switch including a first switch terminal and a second switch terminal and configured to be open or closed in response to a first control signal, the first switch terminal being coupled to the first output terminal, the second switch terminal being coupled to a first capacitor terminal of a capacitor;
- an operational amplifier including a third input terminal, a fourth input terminal, and a second output terminal, the third input terminal being coupled to the first capacitor terminal of the capacitor, the capacitor further including a second capacitor terminal; and
- a second switch including a third switch terminal and a fourth switch terminal, the third switch terminal being coupled to the second output terminal, the fourth switch terminal being coupled to the first output terminal, the second switch being configured to be open or closed in response to a second control signal;

wherein:
- in response to the first control signal being at a first logic level, the second control signal is at a second logic level;
- in response to the first control signal being at the second logic level, the second control signal is at the first logic level; and
- the first logic level and the second logic level are different.

16. The error amplifier of claim 15 wherein the first switch terminal is coupled directly to the first output terminal.

17. The error amplifier of claim 15, further comprising:
a resistor;
wherein the second switch terminal is coupled to the first capacitor terminal through the resistor.

18. The error amplifier of claim 15 wherein the third input terminal is coupled directly to the first capacitor terminal.

19. The error amplifier of claim 15 wherein the third switch terminal is coupled directly to the second output terminal.

20. The error amplifier of claim 15, further comprising:
a resistor;
wherein the fourth switch terminal is coupled to the first output terminal through the resistor.

21. The error amplifier of claim 15 wherein the first switch is configured to be open in response to the first control signal being at the first logic level and to be closed in response to the first control signal being at the second logic level.

22. The error amplifier of claim 15 wherein the second switch is configured to be open in response to the second control signal being at the first logic level and to be closed in response to the second control signal being at the second logic level.

* * * * *